April 11, 1961 T. U. L. BURMEISTER ET AL 2,979,693
COURSE DIRECTIONAL LIGHT BEACON
Filed Aug. 30, 1956 3 Sheets-Sheet 2
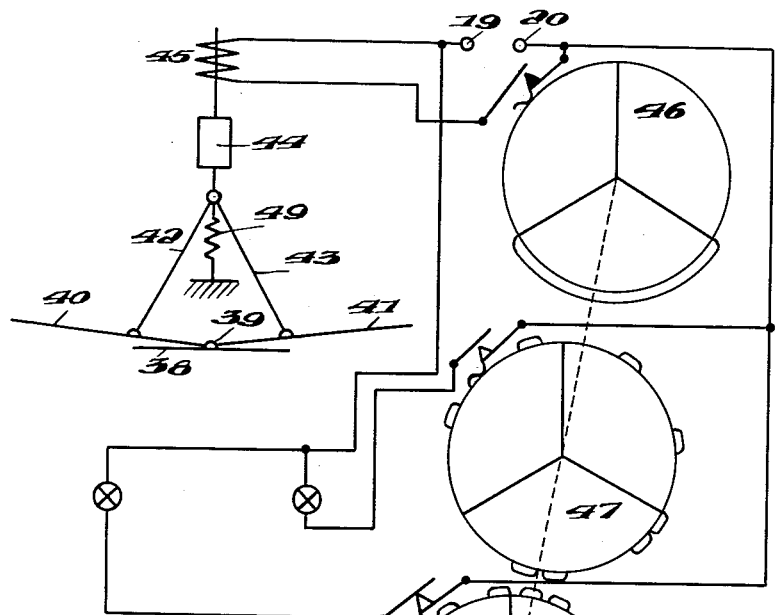
Fig. 3.
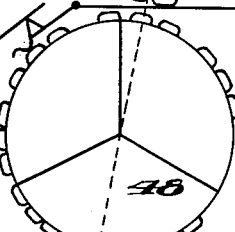
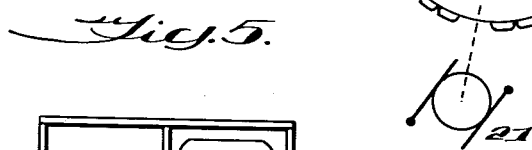
Fig. 5.
INVENTORS
TOIVO UNO LEOPOLD BURMEISTER,
FRANS JOEL FRANSSON,
BY Lawson and Taylor
ATTORNEYS

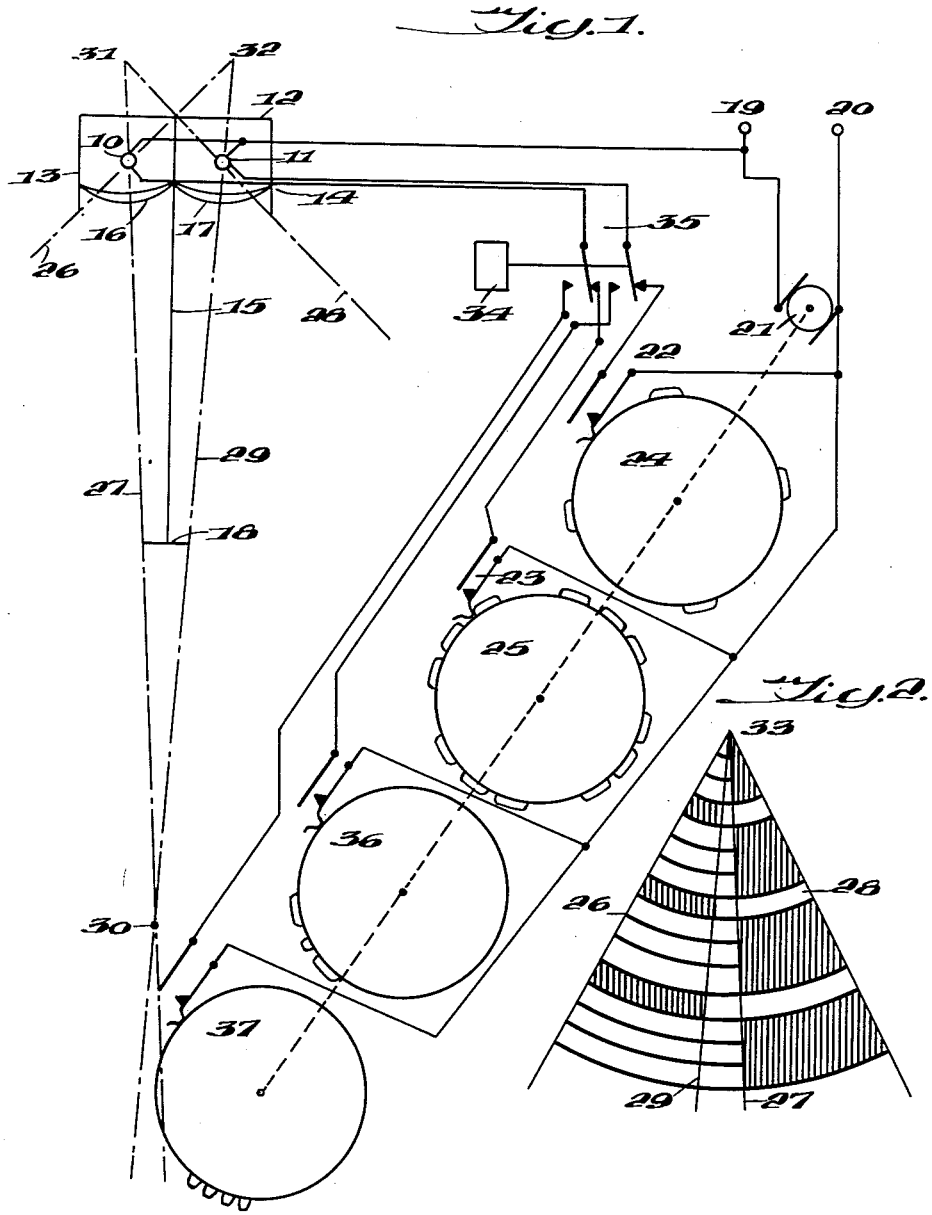

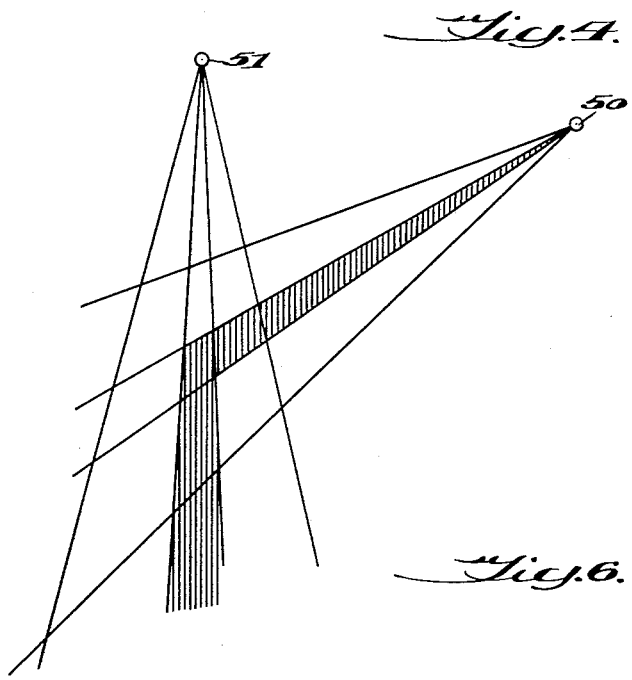
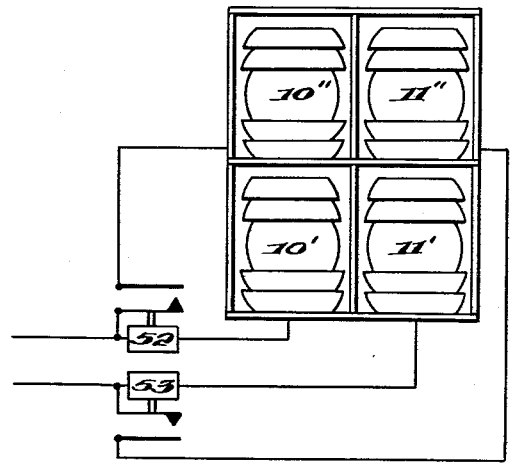

United States Patent Office 2,979,693
Patented Apr. 11, 1961

2,979,693
COURSE DIRECTIONAL LIGHT BEACON

Toivo Uno Leopold Burmeister, Drumso, Finland, and Frans Joel Fransson, Lidingo, Sweden, assignors to Svenska Aktiebolaget Gasaccumulator, Lidingo, Sweden, a corporation of Sweden Filed Aug. 30, 1956, Ser. No. 607,113

Claims priority, application Sweden Sept. 28, 1955

4 Claims. (Cl. 340—26)

In indicating a bearing for navigational purposes, such as when approaching a river mouth, a narrow channel or the like, it has previously been the practice to use so called range markers if visibility was good or directional radio beacons when visibility was poor. The range lines were marked by means of two clearly visible markers placed on the land, such as posts or beacons. In order to indicate a precise bearing, it is necessary that the range markers be spaced at a considerable distance. In many cases, however, the local topographical conditions prevent such an arrangement of range markers.

With a directional radio beacon, it is not necessary that there be sufficient distance between two different points in the direction of the bearing to be indicated. On the contrary, the best bearing indication is given when the two antennas which are usually used in the so called complemental code type are situated as close to each other as possible. It is therefore possible to provide a directional radio beacon at many places where there was not sufficient distance for the arrangement of range markers.

This is, of course, a great disadvantage. Range markers are very cheap to erect and do no cost anything in use. Range beacons are more expensive to erect as well as in use, but are still considerably cheaper than directional radio beacons. In addition, no special equipment is required on the vessel to observe range beacons when visibility is clear, irrespective of whether it is daylight or darkness, nor is any special equipment required for observing the usual range markers in daylight. On the other hand, a radio receiver is necessary to observe the bearing statement from a directional radio beacon, and not all vessels are provided with such a radio receiver.

The present invention provides a lighted range beacon which on the one hand provides a course indication at least as precise as that obtained from a directional radio beacon or from two range markers situated at a sufficient distance apart, but on the other hand has the advantage of the directional radio beacon in that it does not require any additional horizontal space behind the beacon. Furthermore, a beacon according to the present invention has many other advantages, among which is the fact that it can be given the same character as a directional radio beacon of the complemental code type. Thus it is possible to provide a directional radio beacon and a beacon according to the present invention at the same location, and when these are synchronized the arrangement will be most advantageous.

According to the invention, a light beacon is provided with two sources of light, the lights being laterally displaced in a horizontal level which is perpendicular to the bearing direction to be indicated. A screen extending in a vertical plane is disposed between the sources of light in such a manner that within the course angle both of the sources of light are visible, but on each side of the course angle one or the other of the sources of light is blocked by the screen. According to one form of execution of the invention a code generator is provided which is common to the two sources of light, so that light is emanated from the sources in a complemental code. According to another form of execution of the invention, the beacon is combined with a directional radio beacon, and the code generator is common to both the light beacon and the radio beacon. Further details of the invention will be apparent from the following description with reference to the drawings, in which Figure 1 is a schematic drawing illustrating the general principle of the invention, Figure 2 is a diagram showing the code observed within different angles from the beacon, Figure 3 is a schematic of another form of execution of the invention, Figure 4 is a diagram explaining possible uses of the beacon, and Figures 5 and 6 illustrate two modifications of the light beacon.

In the arrangement shown in Figure 1, the two sources of light are indicated at 10 and 11, respectively. As previously described, it is intended that only one of the sources of light should be visible to the observer when he is to port of the course angle and only the other source of light is visible when the observer is starboard of the course angle. However, both of the sources of light should be visible when the observer is within the allowed course angle. In accordance with the internationally adopted procedure for indicating the sides of an allowed course angle in directional radio beacons, one side will hereinafter be indicated as the port side and the other side as the starboard side.

The lamp 10 therefore represents the port light, and the lamp 11 represents the starboard light. The lamps are encased in a covering 12 which extends forwardly forming a screen on each side. The port screen 13 thus limits the angle outwards within which the port light is visible and the starboard screen 14 in a similar manner limits the angle within which the starboard light is visible. Between the lamps there is a screen indicated in the drawing at 15, and which will be referred to below as the middle screen. This screen extends outside the covering 12 a sufficient distance to prevent the occurrence of disturbing light dispersion. With the lenses 16 and 17 of average quality in front of the lights 10 and 11, it is sufficient for the screen 15 to extend between a half a meter and one meter outside the covering 12. The screen may therefore be constructed together with the covering 12 in a single unit, so that the whole apparatus may be carried for erection at a suitable location. The middle screen 15 is limited by a further screen, course angle screen 18, which is disposed at the end of the middle screen remote from the lamps and is substantially perpendicular to the middle screen and thus is also perpendicular to the direction of radiation of the light.

In the embodiment of the invention illustrated, the beacon is fed with the electrical energy, but it is obvious that the power supply is in no way essential to the invention in that any suitable light may be used. In this case the beacon is electrically driven, and a motor is provided to drive a series of curved discs with outwardly extending cams which actuate contact springs to control the feed of current to each of the two lights.

The main power supply terminals are indicated in the drawing as 19 and 20, respectively. By means of a switch for starting the beacon they are connected with a motor 21. From one of the main terminals a common conductor runs each of the lamps 10 and 11, and from the other terminal a conductor is connected to the lamps through contacts 22 and 23 which are actuated in a known manner by the cams on the discs 24 and 25 driven by the motor 21. The discs are shown in enlarged scale for purpose of clarity.

In the code illustrated, as produced by the beacon due to the rotation of cam discs 24 and 25, the port light will flash three times following one another, and then the starboard light will flash once. Then the port light will again flash three times, and so forth. Each of the four flashes thus alternating, corresponds to one-quarter of the cam discs 24 and 25 and therefore they occur one after the other with equal duration and with equal times between flashes.

When the port light is on, the light, therefrom is limited by angles 26 and 27 which are determined by the center of the source of light on one hand, and the port screen 13 and the course angle screen 18 on the other hand. In a similar manner the starboard light will be visible within an angle which is limited by the line 28 between the center of the starboard light and the edge of the starboard screen 14, and by the line between the center of the starboard light and the starboard edge of the course angle screen which is indicated at 29.

It may be seen from the figure that the lines 27 and 29 cross each other at a point 30 which is assumed to be situated so close to the beacon that no navigation takes place inside this point. Outside of the point 30, both of the lights 10 and 11 will be visible within an angle which is limited by the lines 27 and 29, and it is this angle which forms the allowed course angle. It may also be seen that the wider the course angle screen 18 is made the narrower the course angle, but of course this screen must not be made wider than the distance between the centers of the two sources of light. Furthermore, only the port light is visible within an angle limited by the line 26 and the line 29 and only the starboard light is visible within the angle limited by the lines 27 and 28. While it is true that these lines limiting an angle on each side do not emanate from the same source of light, the extended lines intersect each other at such an insignificant distance behind the sources of light, as is shown in the drawing at 31 and 32, that the eye of the observer gets the impression that only a single beacon light exists, and that all of the light emanates from this single source.

Figure 2 is a diagram of the beacon character which is obtained in the manner just described. The beacon there is indicated at 33. It may be seen that a vessel approaching the beacon within the allowed course angle will see four equal flashes at equal intervals. As a matter of fact, the navigator does not count to four, as at a distance from the light, it cannot be seen that three of the flashes are created by one light and the fourth flash is created by another light. The impression is therefore obtained of repeated flashes at evenly spaced intervals. On a vessel approaching the beacon too far to the port side three flashes will be seen in groups with an interval between them corresponding to the duration of one flash plus the interval between flashes. On a vessel approaching the beacon too far to starboard only single flashes at long intervals will be seen. The light flashes are thus coded in such a manner that there is never any doubt as to which sector the navigator is in.

The system of complementary code transmission has been used in the past with directional beacons for radio navigation. The code used usually corresponds to the Morse letters A and N or the Morse letters E and T. As a matter of fact, these two pairs of letters complement each other. However, there is nothing to prevent the use of other complementary code letters, and in the case illustrated the light beacon according to the invention utilizes the complementary code consisting of the Morse letters O and T. In the earlier use of complementary codes for directional radio beacons, they have been combined in such a manner that a continuous sound is heard when both of the signals are received with equal intensity. However, it is questionable whether this point of view is correct, and later investigations have shown that there are advantages to the use of a complementary code such that there are small intervals between the signals which make up the letter. This causes a "stuttering" such that weak sounds are more easily observed, and furthermore it is easier to provide for phase reversal in a radio beacon which is otherwise difficult during a short interval.

In the present case a complementary code has been proposed which is composed of flashes having a duration corresponding to one dash in the Morse code, and intervals therebetween of a duration corresponding to one dot in the Morse alphabet, so that the code can be said to be an O-T code. This has been done so that the light beacon may be combined with a directional radio beacon having the same code emanating from the same location and radiating over the same angular space. Such an arrangement has the advantage that the angular positioning of one beacon may be checked by means of the other one, and vice versa.

On the other hand, the use of codes which are composed only of dashes and dots make it impossible to identify the beacon sufficiently by means of the code. Even if the number of flashes on, for instance, the port side could be varied to either two or three or four, it would not be possible from a practical point of view to go further than this, and the arrangement of a large network of beacons would mean that a number of the beacons would have the same or similar codes. In addition, the composition of the code cannot be observed on a vessel which is within the allowed course angle. It is therefore necessary in practice to suppress the code transmission at evenly spaced intervals in order to transmit an identification code. For this purpose there is a contact watch 34 in the arrangement according to Figure 1 which controls a switch 35 in such a manner that it is periodically reversed and connected to one or more further code discs and their associated contacts.

In the embodiment illustrated it is assumed that the beacon is mounted at the entrance of Konradshamn, and that the identification code of this beacon is KH, in other words a Morse letter composed of one dash, one dot and one dash which is thereafter followed by a second Morse letter composed of four dots. As an example, the port light may transmit the letter sign for K and thereafter the starboard light transmits the letter sign for H. In such a case, the further cam discs 35 and 37 will be in the form illustrated in Figure 1.

In some cases it may be desirable to transmit a signal having different course angles. This may be especially true in a case where a vessel is guided from the open sea into a river mouth and thereafter directed in through the narrower river mouth. In such a case two different codes having wider and narrower course angles will be alternately transmitted. The wider course angle and the associated code will then serve to guide the vessel from the open sea onto the river proper, and the narrower course angle with the associated code serves to guide the vessel up the river towards the harbor. The code of the wider course angle may then, for instance, comprise four port flashes and two starboard flashes thereafter, or a total of six flashes, whereas the code of the narrower course angle may comprise three port flashes and one starboard flash. The two codes can then be distinguished without difficulty.

Figure 3 shows a part of the system illustrated in Figure 1 which has been modified for the case just described. Thus it is assumed that the arrangement of the lamps is the same as in Figure 1, but the course angle screen is adjustable for different widths. When the course angle is to be made wider, the course angle screen should obviously be smaller, and with a narrower course angle the course angle screen should be wider. The adjustment of the width of the course angle screen is achieved by providing the narrower fixed course angle screen 38 with a hinge 39 about which the two halves of the broader course angle screen are rotatable. These half parts 40 and 41 are in turn connected by means of hinges at about their mid-points with two bars 42 and 43, said bars being connected to the armature 44 of an electro-solenoid 45. This solenoid is fed by current from the mains by means of a cam disc 46 and the contact controlled thereby, while the lamps are fed with current over cam disc 47 and 48. These are so arranged that they run synchronously, for instance by being mounted on a common shaft driven by the motor 21.

In the example illustrated it is assumed that the magnet 35 is magnetized and consequently the screens 40 and 41 are folded inwardly so that the beacon is transmitting over the broader course angle during one-third of the revolution of the cam disc 46. During this time the cam discs 47 and 48 cause the transmission of two complete series of codes of the type marking the broader course angle. During the remaining two-thirds of the turn of the cam disc 46, the magnet 45 is de-magnetized so that screens 40 and 41 are brought by spring 49 to extend outwardly in the position shown in the drawing. During this time the lights transmit in accordance with the cut of the cam discs 47 and 48 the code marking the narrower course angle.

The manner in which two beacons having intersecting course angles may be used is illustrated in Figure 4. It is assumed that the entrance to a harbor 50 is very complicated, and that the channel is bent at an angle as shown by the shaded lines. When entering, the navigator first seeks the allowed course angle from a first beacon 51, until he sees the signal from the beacon 50 on the starboard side and in such a manner that he knows he is then within the allowed course angle of that beacon. He then turns starboard and continues on to the beacon 50. For vessels having a lesser depth the two beacons may also serve as an aid in orientation. Each of the beacons transmits four distinct bearings which are known, the lines forming the angles for the port and starboard signals and the lines forming the allowed course angle. In total, therefore, there are no less than sixteen distinct easily observable orientation points in the field. The same arrangement may also be used for orientation of larger vessels when two beacons independent of each other are located on the same shore and in such a manner that their light is visible within the same area.

It is not necessary that the two sources of light 10 and 11 be disposed in the same level. Sometimes an easier construction is achieved if one light is placed in a level above the other, as shown in Figure 5. It should, however, be noted that a horizontal displacement must always be present between two sources of light.

The arrangement shown in Figure 6 provides a safety device for a burned out lamp. The two lower sources of light are intended for normal use and the two upper sources are for reserve purposes. In the source of supply to each of the lamps 10' and 11' which are intended for normal use a thermo relay 52 and 53 has been connected. These thermo relays are set so that they do not react under normal use, but when kept heated keep the lamps 10' and 11' operating. However, if either of these lamps should burn out, so that no current passes thereto, the thermo relay is cooled and switches the contact so that the reserve lamp 10'' replaces the lamp 10' and in a similar way the lamp 11'' replaces the lamp 11'.

The invention is, of course, not limited to the specific forms illustrated and described above, but different modifications may occur within the scope of the invention.

What we claim is:

1. A light beacon to indicate a course angle comprising a pair of lights, said lights being laterally displaced in a horizontal level perpendicular to the course angle, a first screen extending in a vertical plane and disposed between the sources of light and extending forwardly of the lights whereby the edge rays of the lights cross forwardly of the screen to form the course angle, a course angle screen including a fixed screen and a movable screen attached thereto, said course angle screen extending in a vertical plane perpendicularly to the course angle and disposed at the forward end of said first screen, a second screen disposed on that side of the lights opposite to said course angle screen, said second screen screening the light emanating from the lights in a direction away from the range of the course angle, and means connecting said lights with a code mechanism, said code mechanism adapted to transmit light pulses of a constant length.

2. A light beacon according to claim 1 wherein said movable screen is attached to said fixed screen by means of hinges and further including means for setting the position of said movable screen.

3. A light beacon according to claim 2 wherein said last-named means includes a pair of arms and electromagnetic means for moving said arms.

4. A light beacon according to claim 3 including means for transmitting different codes when said movable screen is in different positions.

References Cited in the file of this patent

UNITED STATES PATENTS

| | | |
|---|---|---|
| 1,606,411 | Goble | Nov. 9, 1926 |
| 2,039,812 | Leib | May 5, 1936 |
| 2,297,781 | Korengold | Oct. 6, 1942 |
| 2,458,414 | Penton | Jan. 4, 1949 |
| 2,570,138 | MacKay | Oct. 2, 1951 |

FOREIGN PATENTS

| | | |
|---|---|---|
| 20,941 | Great Britain | Oct. 23, 1897 |
| 108,043 | Austria | Nov. 25, 1927 |
| 631,617 | Germany | June 4, 1936 |